May 29, 1956 — P. BURLIN — 2,747,633
MEAT SLICER GUIDE
Filed June 18, 1953 — 3 Sheets-Sheet 1
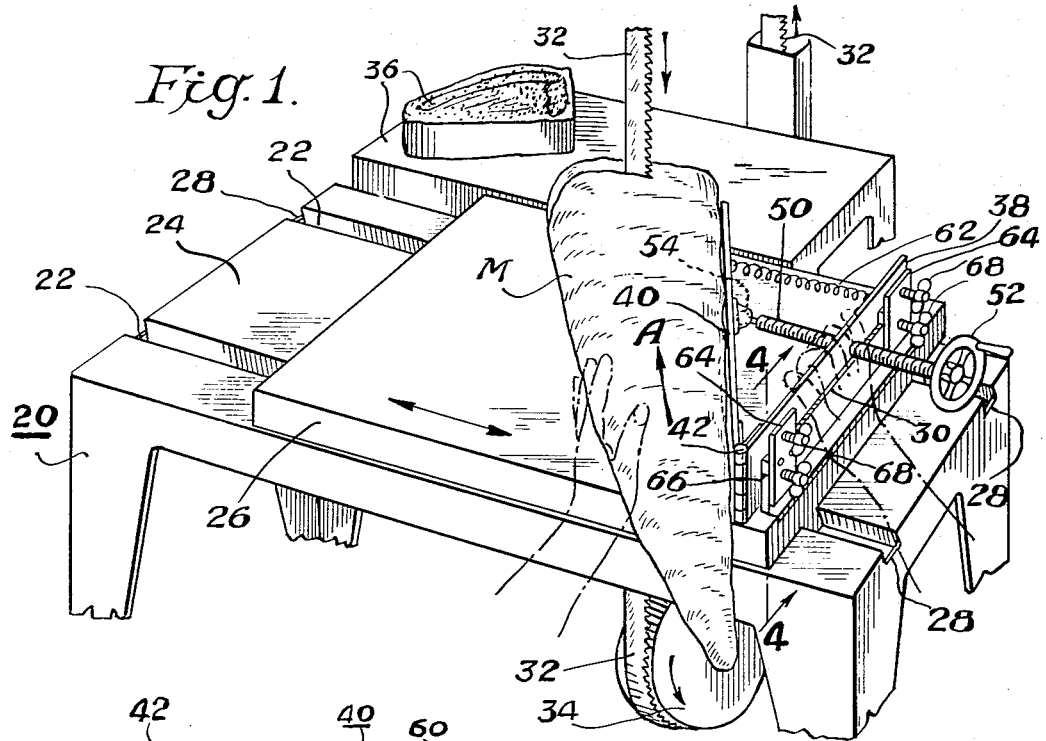
Fig. 1.
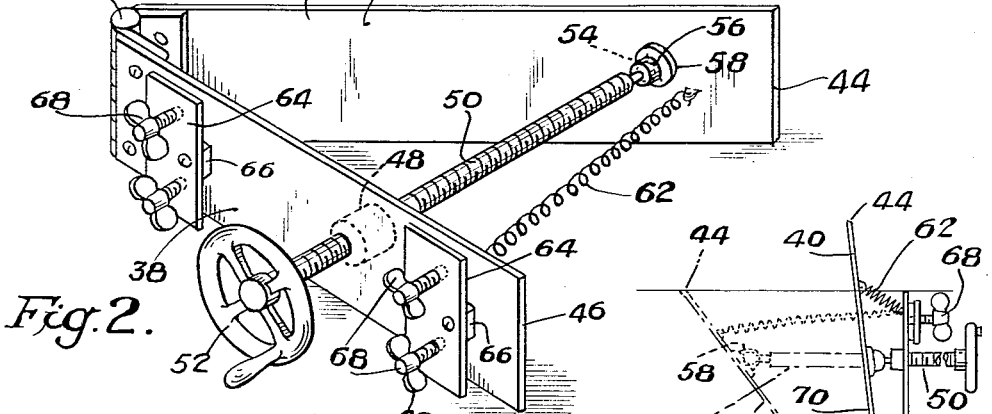
Fig. 2.
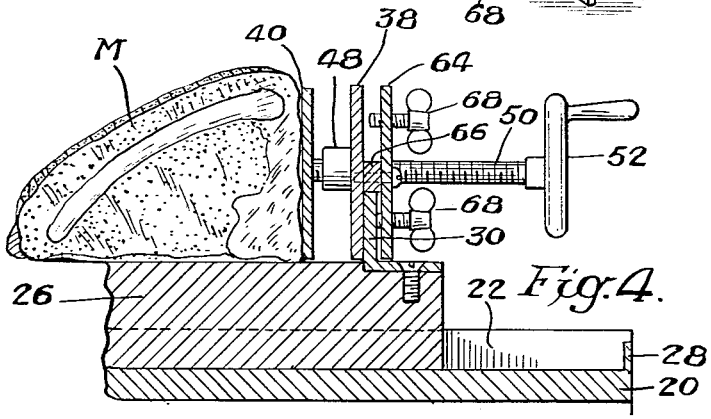
Fig. 4.
Fig. 3.
INVENTOR
Philip Burlin
BY Arthur N. Klein
ATTORNEY

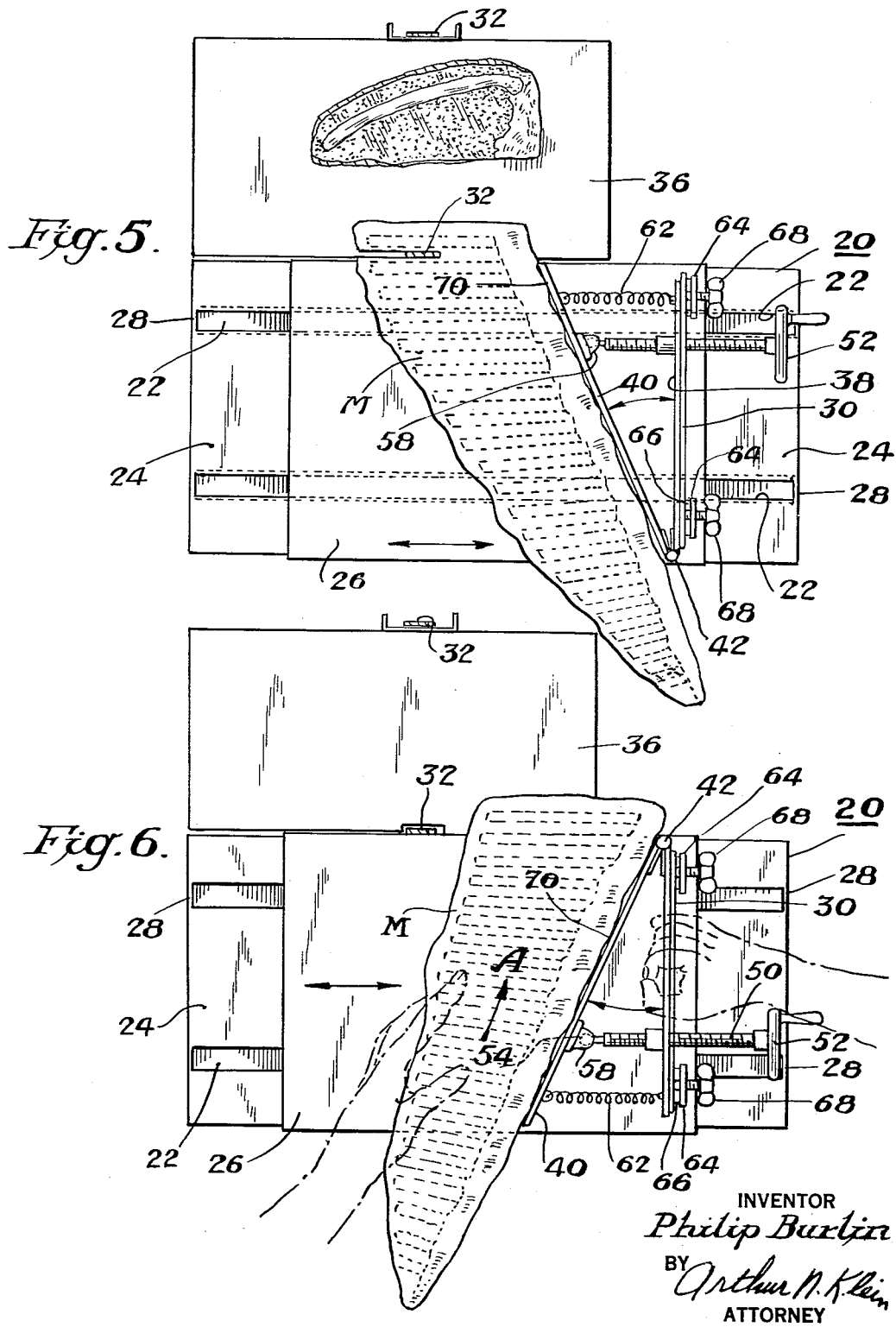

May 29, 1956  P. BURLIN  2,747,633
MEAT SLICER GUIDE

Filed June 18, 1953  3 Sheets-Sheet 3

INVENTOR
Philip Burlin
BY
Arthur N. Klein
ATTORNEY

United States Patent Office 2,747,633
Patented May 29, 1956

2,747,633

MEAT SLICER GUIDE

Philip Burlin, Bayonne, N. J.

Application June 18, 1953, Serial No. 362,581

4 Claims. (Cl. 146—88)

The present invention relates generally to slicing machines and it relates more particularly to machines for slicing large, bone-containing cuts of meat or the like.

An object of the present invention is to provide new and improved mechanism for slicing meats or the like. Another object of the present invention is to provide novel slicing mechanism especially adapted for use on large, bone-containing cuts of meat or the like. Still another object of the present invention is to provide a novel attachment, for use with a slicing machine, which will hold the work in adjustable angular relationship to the cutter, whereby large, bone-containing cuts of meat can be quickly and easily sliced along lines parallel to the ribs or other bones contained in the cut of meat. A further object of the present invention is to provide a simple, inexpensive, durable attachment, which can be installed, quickly and easily, upon conventional horizontal-bed, vertical-cutter slicing machines, in one of two alternative positions, so as to hold the work in either acute-angular relationship or obtuse-angular relationship to the cutter, and thereby to accommodate both left and right cuts of bone-containing meat or the like.

Other objects and advantages of the present invention are apparent in the following detailed description, appended claims and accompanying drawings.

The slicing of large bone-containing cuts of meat, such as sides of beef, veal, pork, etc., has heretofore posed a serious problem for the butcher, due to the need for slicing in a plane parallel to, and customarily between, adjoining ribs or other bones. The problem has been further complicated by the fact that, after the carcass of the slaughtered animal has been split down the backbone or chine bone as is customary, the left and right cuts thus formed have the ribs extending in different angular relationship to the chine bone. Additionally, this angular relationship varies, from rib to rib, in a single cut of meat.

Conventional slicing machines, such as are used on boneless, smoked or pickled cuts of meat, sausages, and other delicatessen products, have proven useless on bone-containing sides of beef and the like.

As a result, it has heretofore been necessary for butchers either to employ the laborious and time-consuming process of hand cutting and sawing, or to adopt the dangerous procedure of holding and guiding the cut of meat by hand while using a band saw or other power cutter. The latter practice not only is clumsy and difficult but also frequently results in mangling or amputation of the hands or fingers due to sudden and unpredictable movements of the meat during the cutting process.

According to the present invention, there has been developed, for the first time, a simple and inexpensive guide or holder, adapted for use on a conventional and commercially available cutting machine comprising a band saw (or other power cutter) and a carriage reciprocable relative thereto, which will hold the bone-containing cut of meat securely at a predetermined and easily adjustable angle relative to the band saw, and which can be affixed to the carriage in either of two positions to permit its use with left or right cuts of meat.

Generally speaking, the guide or holder of the present invention comprises a back plate and a guide plate pivotally connected at one end to give a generally V-shaped configuration; the back plate having means for detachably connecting it to the carriage so that either of its longitudinal edges can, alternatively, abut the carriage surface, whereby either the free end or the pivoted end of the guide plate can be positioned adjacent the band saw; the holder also including a manually operable adjusting member mounted on the back plate and operatively connected to the guide plate, whereby longitudinal movement of the adjusting member causes pivotal movement of the guide plate relative to the back plate and also relative to the band saw.

For the purpose of illustrating the invention, there are shown, in the accompanying drawings, forms thereof which are presently preferred and have been found in practice to give satisfactory results; such showing, however, being merely by way of illustration, and not by way of restriction of the scope of the invention.

Referring to the accompanying drawings in which like reference characters indicate like parts throughout:

Figure 1 is a perspective view of one embodiment of the guide or holder of the present invention, shown as it appears in use on a cutting machine including a horizontally reciprocable carriage and a vertically moving band saw.

Figure 2 is an enlarged perspective view, at a somewhat different angle, of the guide or holder of Fig. 1.

Figure 3 is a top plan view on a reduced scale of the embodiment of Fig. 2; the guide plate being shown at a minimum angle to the back plate in solid lines and at a relatively large angle to the back plate in dash-dot lines.

Figure 4 is a fragmentary cross-sectional view taken generally along the line 4—4 of Fig. 1.

Figure 5 is a top plan view of the embodiment of Fig. 1 showing the guide or holder so positioned that the guide plate forms an obtuse angle with the plane of the band saw; the free end of the guide plate being disposed relatively adjacent the saw.

Figure 6 is a top plan view, like that of Fig. 5, but showing the guide or holder in alternative reversed position, wherein the guide plate forms an acute angle with the plane of the band saw; the pivoted end of the guide plate being adjacent the saw.

Figure 7:
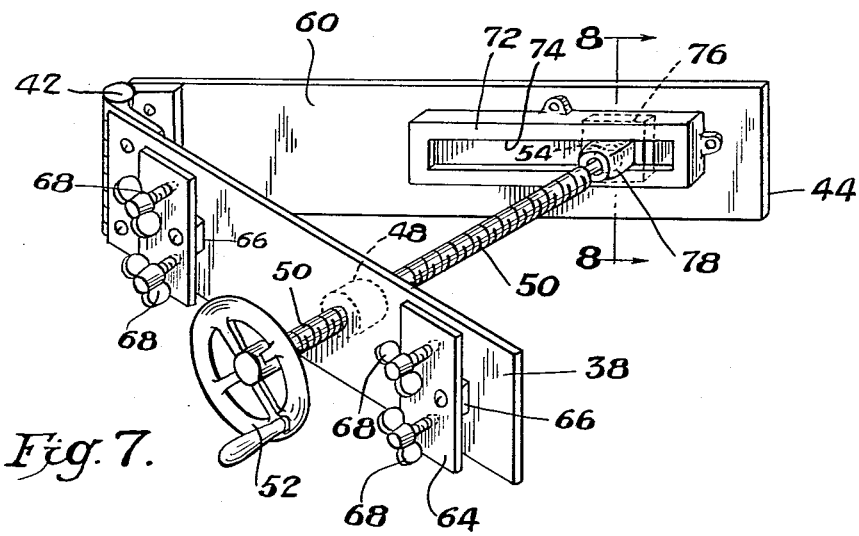
Figure 7 is a perspective view, like that of Fig. 2, but showing another embodiment of the present invention.

Referring to the embodiment of Figs. 1–6, the novel guide or holder of the present invention is shown in conjunction with a table or support 20 having spaced grooves or tracks 22 formed in, and extending longitudinally along, its horizontal top surface or bed 24. A carriage 26 is mounted for horizontal reciprocable movement relative to the tracks 22, which are provided with end stops 28.

The carriage 26 is generally rectangular, with a generally horizontal top surface and with an upturned flange 30 extending transversely along one edge thereof.

A band saw 32 is operatively disposed adjacent one of the longitudinal edges of the table 20. The band saw 32 is of conventional construction and comprises an endless toothed steel band passing over top and bottom wheels 34 (only the bottom wheel being shown), one of which is driven by a motor (not shown) to cause rotation of the band saw in a generally vertical plane, with its forward working run moving downwardly.

A second table 36 is disposed on the other side of the band saw, the top 38 of the table 36 being generally at the same level as the top of the carriage 26 and being adapted to catch the slices of meat upon operation of the device in a manner to be hereinafter described.

The novel guide or holder of the present invention, as best shown in Fig. 2, is composed of a back plate 38 and a guide plate 40 connected at one end by a double-leaf hinge 42. The plates 38 and 40 may be of relatively thin, flat metal or the like, having generally the same width or transverse dimension. However, the length of the guide plate 40 is somewhat greater than that of the back plate 38, so that, when the two plates are in relatively adjoining position, the free edge 44 of the plate 40 is disposed somewhat beyond and outside of the free edge 46 of the back plate 38, as shown in solid lines in Fig. 3. The relative lengths of the two plates are such that, as indicated in dash-dot lines in Fig. 3, even with the plates in their position of greatest spread, the free edge 44 will at least reach a line drawn perpendicular to the plate 38 from the free edge 46 thereof. This eliminates the possibility of accidental contact between the back plate and the band saw, as will be apparent from the following description.

Intermediate its ends, the back plate 38 is provided with an internally screw threaded, apertured collar or boss 48, through which extends an elongated externally screw threaded adjusting shaft or arm 50. The outer end of the arm 50 is provided with an operating wheel 52, while a ball 54 is formed on the inner end of the arm. The ball 54 fits swivelably within the socket portion 56 of a bearing member 58 having a flat surface adapted to fit against and move slidably along the inner face 60 of the guide plate 40. An expansion spring 62 connects the face 60 with the inner face 62 of the back plate 38 and tends to pull the plates 38 and 40 together, and to maintain the face 60 in contact with the flat surface of the bearing member 58.

It is obvious that, by rotating the wheel 52 in one direction, the user can cause axial movement of the arm 50 (toward the left in Figs. 1, 3 and 5) so as to shift the guide plate 40 to a more divergent angular relationship with the base plate 38, thereby extending the spring 62. Conversely, opposite rotation of the wheel 52 causes axial movement of the arm 50 in the opposite direction (i. e., toward the right in Figs. 1, 3 and 5), thereby permitting the spring 62 progressively to pull the leaf or plate 40 toward the plate 38. Since the arm 50 always remains perpendicular to the back plate 38, it follows that its axis is at an increasingly greater angle relative to the guide plate 40 as the latter is forced outward thereby. Compare the solid line and dash-dot line positions of Fig. 3.

During this angular shifting of the guide plate 40, the inner face 60 slides longitudinally relative to the flat surface of the bearing member 58; the parts 54 and 56 providing the swiveling action needed for the continuous angular shift between the plate 40 and the arm 50.

Upon the outer face 64 of the back plate 38, there are mounted a pair of longitudinally-spaced clamp-plates 64, each extending generally transversely relative to the plate 38 and spaced somewhat away therefrom by a relatively narrow center spacing block 66. Each clamp-plate 64 is provided with a pair of wing-screws 68, disposed on opposite sides of the spacing block and extending through the clamp-plate in screw-threaded adjustable relationship thereto.

In mounting the guide upon the carriage 26, in the position shown in Figs. 1 and 5, it is placed so that the flange 30 is disposed intermediate the plate 38 and the clamp-plates 64, below the spacing-block, as shown in Fig. 4. The lower wing-screw of each clamping plate is then tightened to lock the back plate 38 securely to the flange 30. In this position, the guide plate extends at an obtuse angle relative to the plane of the saw 32 (the angle being variable by operation of the wheel 52 as described above) with the free edges 44 and 46 short of the plane of the saw, so that reciprocation of the carriage cannot bring the saw into contact with either of the plates 38 and 40.

A cut of meat M is then placed on the carriage 26, so that the spine or chine bone abuts the outer face 70 of the guide plate 40. The handle or wheel 52 is then manipulated to shift the angle of the guide plate so as to bring the rib bones of the cut of meat into parallelism with the plane of the saw 32 as indicated in Fig. 5.

The operator then places one hand upon the cut of meat M (as indicated in interrupted lines in Fig. 1) and pushes the meat in the direction of the arrow A, until the end of the cut of meat protrudes somewhat beyond the free edge 44 of the guide plate 40 so as to intersect the plane of the saw 32. With the other hand grasping the back plate 38 (as also indicated in interrupted lines in Fig. 1) or any other convenient portion of the guide or carriage 26, the operator then manually shifts the carriage (toward the left in Figs. 1 and 5) so as to cause the saw to slice off the protruding portion of the meat; the cut being made at any desired point and along a line parallel to the planes of the adjoining rib bones.

The operator then manually returns the carriage to starting position, again advances the cut of meat, and repeats the slicing operation; and so on.

When an opposite cut of meat is to be sliced, the guide or holder of the present invention is disconnected from the carriage, turned around (so as to position the opposite longitudinal edges of the plates 38 and 40 lowermost), and refastened to the carriage in the manner shown in Fig. 6. In this position, the hinge 42 (rather than the free edges 44 and 46) is adjacent the saw 32, and the guide plate 40 forms an acute angle with the plane of the saw.

The wheel 52 is then manipulated to adjust the angle of the guide plate (so as to bring the rib bones into parallelism with the plane of the saw), the meat is manually advanced, and the carriage is manually reciprocated to slice the meat in a manner like that described above.

Since all of the rib bones do not extend at precisely the same angle from the back bone, it may become necessary to adjust the angle of the guide plate at one or more stages of the slicing of a cut of meat. The operator can do this quickly and easily by manipulating the wheel 52, using the same hand employed for shifting the carriage.

It can be seen that, at no time is it necessary for the operator to place either hand anywhere near the band saw, so that there is no danger of mutilation or amputation. Of course, conventional safety guards (not shown) can also be provided for the band saw to minimize further the possibility of injury due to carelessness or inadvertence on the part of the operator.

Figure 8:
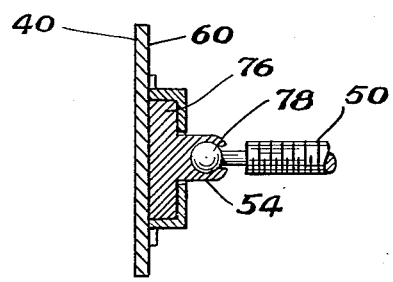
Figure 8 is an enlarged cross-sectional view, taken generally along the line 8—8 of Fig. 7.

In Figs. 7 and 8 there is shown a modified embodiment of the novel guide of the present invention.

In this embodiment, the spring 62 is eliminated and a positive interlock is provided intermediate the adjusting arm 50 and the inner face 60 of the guide plate 40.

Thus, a generally enclosed channel member 72, more or less U-shaped in cross-section, is affixed to the face 60; the member 72 being provided with an elongated longitudinal slot 74. A generally rectangular bearing member 76 is slidably disposed within the channel member and is provided with a socket portion 78 which protrudes through the slot 74. The ball 54 on the end of the threaded adjusting arm 50 is swivelably disposed within the socket portion 78, as in the embodiment of Figs. 1–6.

It can be seen that operation of the wheel 52 in one direction will cause extension of the arm 50 and will swing the guide plate 40 to a greater angle relative to the back plate 38; the face 60 and the channel member shifting relative to the bearing member 76, while the bearing member swivels relative to the ball 54 to accommodate the greater angle produced. Conversely, opposite rotation of the wheel 52 will bring the guide plate toward the back plate; the bearing member exerting a pull on the channel member 72 and at the same time swiveling back to a smaller angle relative to the arm 50.

The present invention may be embodied in other specific forms and, therefore, the foregoing embodiments are to be considered merely as illustrative and not restrictive, reference being made to the appended claims rather than the preceding description, as indicative of the scope of this invention.

Having thus described my invention, I claim as new and desire to protect by Letters Patent the following:

1. For use in slicing bone-containing cuts of meat or the like, an adjustable guide constructed and arranged to hold the cut of meat in predetermined angular relationship to the cutting element, said guide comprising a relatively thin flat elongated back plate and a relatively thin flat elongated guide plate, a double-leaf hinge pivotally connecting said plates at one end, releasable engaging means securing the back plate to the carriage of a slicing machine in fixed generally right-angular relationship to the cutter, an elongated adjusting arm screw-threadedly mounted on the back plate and extending in fixed right-angular relationship therethrough, an operating member mounted at the outer end of said arm, a bearing member swivelably mounted at the inner end of said arm and having a flat surface slidably bearing against the inner face of the guide plate, and means for effecting sliding interconnection between the bearing member and the inner face of the guide plate, whereby axial movement of the adjusting arm causes pivotation of the guide plate relative to the back plate.

2. A construction according to claim 1 wherein the releasable engaging means comprises separate clamps disposed along both of its longitudinal edges whereby the guide can be secured to the carriage of a slicing machine or the like in either of two positions rotated 180 degrees from each other so as to position either the pivoted end or the free end of the guide plate adjacent the cutter of the machine, and thereby to hold the cut of meat at either an acute angle or an obtuse angle relative to the plane of the cutter.

3. A construction according to claim 2 wherein the guide plate and the back plate are connected by a tension spring which serves yieldably to maintain the inner face of the guide plate in contact with the bearing member regardless of the degree of extension of the adjusting arm.

4. A construction according to claim 2 wherein a generally enclosed channel member is mounted on the inner face of the guide plate, the bearing member being slidably disposed within said channel member and having a socket portion protruding through the slot, the end of the adjusting arm carrying a ball fitting swivelably within said socket portion.

References Cited in the file of this patent
UNITED STATES PATENTS

| | | |
|---|---|---|
| 812,574 | Linten | Feb. 13, 1906 |
| 2,032,976 | Carter | Mar. 3, 1936 |
| 2,187,312 | Goodlake | Jan. 16, 1940 |
| 2,458,054 | Brown | Jan. 4, 1949 |